US00RE47699E

(19) United States
(12) Reissued Patent
Kubota

(10) Patent Number: US RE47,699 E
(45) Date of Reissued Patent: Nov. 5, 2019

(54) IMAGING LENS

(71) Applicants: OPTICAL LOGIC INC., Nagano (JP); KANTATSU CO., LTD., Tochigi (JP)

(72) Inventor: Yoji Kubota, Nagano (JP)

(73) Assignee: KANTATSU CO., LTD., Tochigi (JP)

(21) Appl. No.: 15/872,170

(22) Filed: Jan. 16, 2018

Related U.S. Patent Documents

Reissue of:
(64) Patent No.: 8,411,376
Issued: Apr. 2, 2013
Appl. No.: 13/168,145
Filed: Jun. 24, 2011

U.S. Applications:
(63) Continuation of application No. 15/154,052, filed on May 13, 2016, now Pat. No. Re. 46,946, which is a
(Continued)

(30) Foreign Application Priority Data

Dec. 25, 2008 (JP) ..... 2008-329285

(51) Int. Cl.
*G02B 13/00* (2006.01)
*G02B 9/60* (2006.01)
*G02B 13/18* (2006.01)

(52) U.S. Cl.
CPC ..... *G02B 13/0045* (2013.01); *G02B 9/60* (2013.01)

(58) Field of Classification Search
CPC ..... G02B 9/60; G02B 13/18; G02B 13/0045
See application file for complete search history.

(56) References Cited

U.S. PATENT DOCUMENTS 3,388,956 A 6/1968 Eggert et al.
3,942,875 A 3/1976 Betensky
(Continued)

FOREIGN PATENT DOCUMENTS

JP 41-006865 4/1966
JP S41-006865 4/1966
(Continued)

OTHER PUBLICATIONS

Hobbs, P. C. D. Chapter 4: Lenses, prisms, and Mirrors, in Building Electro-Optical Systems; Making it all Work, Second Edition, John Wiley & Sons, Inc., Hoboken, NJ, U.S.A., 2009, pp. 145-179.
(Continued)

*Primary Examiner* — Christina Y. Leung
(74) *Attorney, Agent, or Firm* — Kubotera & Associates, LLC

(57) ABSTRACT

An imaging lens includes an aperture stop, a positive first lens with a biconvex shape, a negative second lens; a negative third lens, a positive fourth lens, and a negative fifth lens arranged in this order from an object side. When the whole lens system has a focal length f, focal lengths and Abbe's numbers of the first and the second lenses are f1, νd1, f2, and νd2, focal lengths of the fourth and fifth lenses are f4 and f5, a composite focal length of the first lens L1 and the second lens L2 is f12, and a distance from a surface of the first lens L1 on the object side to a surface of the fifth lens L5 on the image side is Σd, the imaging lens satisfies the following conditional expressions:

$$0.7<f12/f<1.4$$

$$0.2<|f1/f2|<0.6$$

$$15<\nu d1-\nu d2$$

$$0.4<f4/f<1.0$$

$$\Sigma d/f<1.2$$

$$|f5/f|<1.0$$

18 Claims, 15 Drawing Sheets

Related U.S. Application Data continuation of application No. PCT/JP2009/006799, filed on Dec. 11, 2009, said application No. 15/154,052 is a continuation of application No. 14/642,942, filed on Mar. 10, 2015, now Pat. No. Re. 46,034, which is an application for the reissue of Pat. No. 8,411,376.

(56) References Cited

U.S. PATENT DOCUMENTS

| | | | | |
|---|---|---|---|---|
| 4,464,024 | A | 8/1984 | Yamada | |
| 5,073,017 | A | 12/1991 | Suda | |
| 7,075,736 | B1 | 7/2006 | Lundgren | |
| 7,826,151 | B2 | 11/2010 | Tsai | |
| 8,000,030 | B2 * | 8/2011 | Tang | 359/714 |
| 2007/0229984 | A1 | 10/2007 | Shinohara | |
| 2009/0122423 | A1 | 5/2009 | Park | |

FOREIGN PATENT DOCUMENTS

| | | | |
|---|---|---|---|
| JP | 60-023814 | A | 2/1985 |
| JP | S60-023814 | A | 2/1985 |
| JP | 62-203119 | A | 9/1987 |
| JP | S62-203119 | A | 9/1987 |
| JP | 05-127079 | A | 5/1993 |
| JP | H05-127079 | A | 5/1993 |
| JP | 2003-140037 | A | 5/2003 |
| JP | 2005-265950 | A | 9/2005 |
| JP | 2007-264180 | A | 10/2007 |
| JP | 2008-542821 | A | 11/2008 |

OTHER PUBLICATIONS

Eugene Hect, Optics 4th Edition: More on Geometrical Optics, Addison Welsley, SF, U.S.A., 2002, pp. 243-246.

Office Action for Japanese Patent Application 2008-329285, Oct. 18, 2012, Japan Patent Office.

* cited by examiner

IMAGING LENS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

*The present application is a continuation reissue application of the application Ser. No. 15/154,052, issued as U.S. Pat. No. RE46,946, which is a continuation reissue application of the application Ser. No. 14/642,942, issued as U.S. Pat. No. RE46,034, which is an application for reissue of U.S. Pat. No. 8,411,376. The present application has co-pending continuation reissue application Ser. Nos. 15/874,200 and 15/876,281.*

This is a continuation application of the prior PCT application PCT/JP2009/006799, filed on Dec. 11, 2009, pending, which claims priority from a Japanese patent application No. 2008-329285, filed on Dec. 25, 2008, the entire content of which is incorporated herein by reference.

BACKGROUND OF THE INVENTION AND RELATED ART STATEMENT

The present invention relates to an imaging lens for forming an image on an imaging element such as a CCD sensor and a CMOS sensor. In particular, the present invention relates to an imaging lens suitable for mounting in a relatively small camera such as a cellular phone, a digital still camera, a portable information terminal, a security camera, an onboard camera, and a network camera.

An imaging lens to be mounted in a small camera has been required to have a high resolution lens configuration suitable for a recently developed imaging element with a high resolution, as well as to use a fewer number of lenses. Conventionally, a three-lens imaging lens has been frequently used as such an imaging lens. However, as an imaging element has higher resolution, it is more difficult to obtain sufficient performances only with three lenses. In these years, another lens configuration, a four-lens configuration or a five-lens configuration, has been applied.

Among the configurations, since a configuration with five lenses has a higher design flexibility, it may be expected to apply such lens configuration in a next-generation imaging lens. An imaging lens disclosed in Patent Reference has been known as an imaging lens having such a five-lens configuration.

The imaging lens disclosed in Patent Reference includes a positive first lens having a convex surface on the object side; a second lens having a negative meniscus shape that directs a concave surface on the image side; a third lens having a positive meniscus shape that directs a convex surface on the image side; a negative fourth lens in which both surfaces have an aspheric shape and a surface thereof on the image side near an optical axis is concave; and a positive or negative fifth lens, in which both surfaces are aspheric shape, in this order from the object side.

In this configuration, when a lower limit of Abbe's number of the first lens and upper limits of Abbe's numbers of the second and the fourth lens are respectively assigned, an axial chromatic aberration and chromatic aberration of magnification are corrected, so as to compatible with a high performance imaging lens.

Patent Reference Japanese Patent Application Publication No. 2007-264180

According to the imaging lens disclosed in Patent Reference, it is possible to obtain relatively satisfactory aberrations. Since the total length of the lens system is long, however, it is difficult to attain both miniaturization of an imaging lens and satisfactory aberration correction.

In view of the problems of the conventional techniques described above, an object of the present invention is to provide an imaging lens with a small size capable of properly correcting aberration.

SUMMARY OF THE INVENTION

In order to attain the object described above, according to the present invention, an imaging lens includes a first lens having positive refractive power; a second lens having negative refractive power; a third lens having negative refractive power; a fourth lens having positive refractive power; and a fifth lens having negative refractive power in this order from the object side to the image side. The first lens is shaped to form a biconvex lens and the second lens is shaped to form a lens that directs a concave surface on the object side.

According to the invention, the first lens is shaped to form a biconvex lens. Therefore, it is possible to set the refractive power of the first lens relatively strong, so that it is possible to suitably attain miniaturization of an imaging lens. On the other hand, with this first lens having positive refractive power, there remains a concern of generation of field curvature. For this reason, according to the invention, disposing on the image side of the first lens the second lens having negative refractive power so as to direct the concave surface on the object side, it is possible to reduce worsening of the field curvature generated at the first lens. Therefore, according to the imaging lens of this invention, despite the small size, it is possible to satisfactorily correct the aberrations.

Here, for a shape of the third lens, for example, it may be possible to choose a shape of a meniscus lens that directs a concave surface on the object side. In addition, as a shape of the fourth lens, for example, it may be possible to choose a shape of a biconvex lens.

According to the imaging lens with the above-described configuration, when the whole lens system has a focal length f and a composite focal length of the first lens and the second lens is f12, it is preferred to satisfy the following conditional expression (1):

$$0.7<f12/f<1.4 \quad (1)$$

When the above conditional expression (1) is satisfied, it is possible to keep the total length of the imaging lens short and also the field curvature and coma aberration stable. When the value exceeds the upper limit "1.4", the focal length of the first lens increases, so that it is difficult to attain a small-sized imaging lens. On the other hand, if it is below the lower limit "0.7", the refractive power of the first lens is too strong, so that it is difficult to secure the back focal length. In order to secure a certain back focal length, it is necessary to increase the refractive power of the third lens. When the value is below the lower limit "0.7", even if it is possible to attain a small-sized imaging lens, it is difficult to correct the field curvature and correct coma aberration, so that it is difficult to attain both a small-sized imaging lens and satisfactory aberration correction.

Furthermore, according to the imaging lens with the aforementioned configuration, when the first lens has a focal length f1 and the second lens has a focal length f2, it is preferred to satisfy the following conditional expression (2):

$$0.2<|f1/f2|<0.6 \quad (2)$$

When the above conditional expression (2) is satisfied, it is possible to keep the axial chromatic aberration and spherical aberration stable. When the value exceeds the upper limit "0.6", since the refractive power of the second lens increases, the axial chromatic aberration is in the plus direction in relative to that of a reference wavelength and is excessively corrected. In addition, the spherical aberration is in the plus direction at a ring zone section and is excessively corrected.

As a result, it is difficult to keep the axial chromatic aberration and spherical aberration stable. On the other hand, when the value is below the lower limit "0.2", since the refractive power of the second lens decreases, the axial chromatic aberration is in the minus direction in relative to that of the reference wavelength and is insufficiently corrected. In addition, even the spherical aberration is in the minus direction at the ring zone section and is similarly insufficiently corrected. Therefore, even in this case, it is difficult to keep the axial chromatic aberration and spherical aberration stable, and it is difficult to obtain satisfactory imaging performance.

Moreover, in case of the imaging lens with the aforementioned configuration, when Abbe's number of the first lens is νd1 and Abbe's number of the second lens is νd2, it is more preferred to satisfy the following conditional expression (3):

$$15<\nu d1-\nu d2 \quad (3)$$

When the above conditional expression (3) is satisfied, it is possible to keep the axial chromatic aberration and off-axis chromatic aberration stable while satisfactorily correcting those chromatic aberrations. If the conditional expression (3) is not satisfied, the axial chromatic aberrations at short wavelengths increase in the minus direction in relative to that of the reference wavelength, and the aberration is insufficiently corrected.

When the Abbe's number of the third lens is set to a small value in order to improve such insufficient correction of chromatic aberration, the axial chromatic aberration is satisfactorily corrected, but the off-axis chromatic aberration of magnification is excessively corrected and worsened.

Further, in case of the imaging lens with the aforementioned configuration, when the whole lens system has a focal length f and the fourth lens has a focal length f4, it is more preferred to satisfy the following conditional expression (4):

$$0.4<f4/f<1.0 \quad (4)$$

In case of an imaging element such as a CCD sensor and a CMOS sensor, there is a limit in an acceptance angle of an incoming light beam due to its structure. Generally speaking, this limit in the acceptance angle of an incoming light beam is provided as certain range around principal light beam (e.g. ±25° of the principal light beam).

When an angle of emergence of the off-axis principal light beam is outside the limitation range, since a sensor does not take a light beam outside the range therein, a resultant image taken through the imaging lens has a periphery that is dark in comparison with a center part. In other words, a shading phenomenon occurs.

When the aforementioned conditional expression (4) is satisfied, it is possible to keep the maximum angle of emergence of the off-axis principal light beam small while keeping each aberration stable. When the value exceeds the upper limit "1.0", since the refractive power of the fourth lens decreases, while it is easy to correct the coma aberration and the chromatic aberration of magnification, the maximum angle of emergence of the off-axis principal light beam becomes large and a shading phenomenon more easily occurs. On the other hand, when the value is below the lower limit "0.4", since the refractive power of the fourth lens increases, although it is possible to reduce the maximum angle of emergence of the off-axis principal light beam, it is difficult to correct the field curvature and the distortion.

Moreover, in the imaging lens with the aforementioned configuration, when the whole lens system has a focal length f and a distance on the optical axis from a surface of the first lens on the object side to a surface of the fifth lens on the image side is Σd, it is preferred to satisfy the following conditional expression (5) also in view of miniaturization of an imaging lens:

$$\Sigma d/f<1.2 \quad (5)$$

In addition, in the imaging lens with the aforementioned configuration, when the whole lens system has a focal length f and the fifth lens has a focal length f5, it is preferred to satisfy the following conditional expression (6):

$$|f5/f|<1.0 \quad (6)$$

As well known, as an effective means to attain miniaturization of an imaging lens, it may be possible to reduce a focal length of a lens. Actually, this approach has been employed in designing many imaging lenses. However, when a focal length decreases while keeping an ideal image height constant, the angle of emergence of the off-axis light beam increases, and it is more difficult to balance among aberrations including a spherical aberration, a chromatic aberration, distortion, and a field curvature. Therefore, it is necessary to attain miniaturization of an imaging lens while keeping the focal length long.

When the imaging lens has a configuration that satisfies the conditional expression (6), a position of a principal point of the optical system moves towards the object side, so that it is possible to attain miniaturization of an imaging lens while keeping the focal length long. Here, it is effective to satisfy the conditional expression (5) also as a means to supplement insufficient correction of axial chromatic aberration.

According to the imaging lens of the invention, it is possible to both reduce the size of the imaging lens and correct the aberration properly, thereby making it possible to provide the imaging lens with the small size capable of correcting aberrations properly.

DETAILED DESCRIPTION OF PREFERRED EMBODIMENTS

First Embodiment

Hereunder, referring to the accompanying drawings, a first embodiment of the present invention will be fully described.

FIGS. 1, 4, and 7, and 10 are schematic sectional views showing image lenses in Numerical Data Examples 1 to 4 according to the embodiment, respectively. Since a basic lens configuration is the same among the Numerical Data Examples 1 to 4, the lens configuration of the embodiments will be described with reference to the lens sectional view of Numerical Data Example 1.

Figure 1:
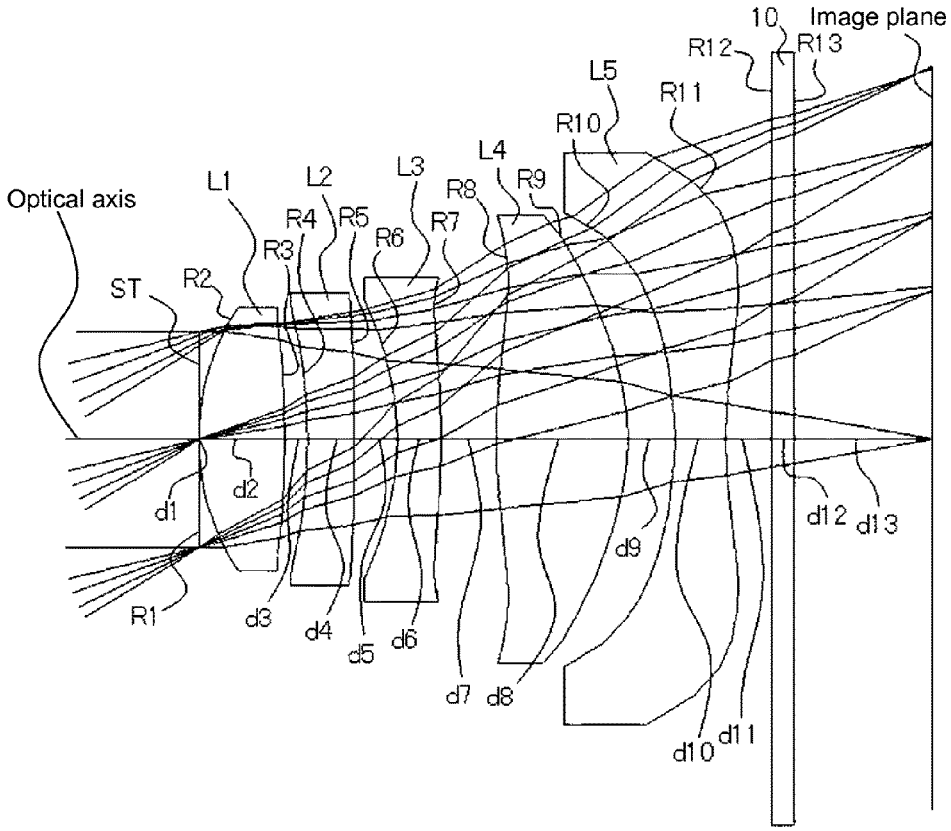
FIG. 1 is a schematic sectional view showing a configuration of an imaging lens in Numerical Data Example 1.

As shown in FIG. 1, the imaging lens of the embodiment includes an aperture stop ST; a first lens L1 having positive refractive power; a second lens L2 having negative refractive power; a third lens L3 having negative refractive power; a fourth lens L4 having positive refractive power; and a fifth lens L5 having negative refractive power, which are arranged in this order from an object side to an image side of the imaging lens. A cover glass 10 is provided between the fifth lens L5 and the image plane of an imaging element. It is noted that the cover glass 10 may be optionally omitted.

In the imaging lens with the above-described configuration, the first lens L1 is a biconvex lens, and the second lens L2 is a meniscus lens that directs a concave surface on the object side. These first lens L1 and the second lens L2 satisfy the following conditional expressions (1) to (3):

$$0.7<f12/f<1.4 \quad (1)$$

$$0.2<|f1/f2|<0.6 \quad (2)$$

$$15<\nu d1-\nu d2 \quad (3)$$

In the above conditional expressions, f: Focal length of the whole lens system f1: Focal length of the first lens L1 f2: Focal length of the second lens L2 f12: Composite focal length of the first lens L1 and the second lens L2

νd1: Abbe's number of the first lens L1

νd2: Abbe's number of the second lens L2

When the conditional expressions (1) to (3) are satisfied, it is possible to obtain the following effects respectively. When the conditional expression (1) is satisfied, it is possible to keep the field curvature and coma aberration stable while keeping the whole length of the imaging lens short. In addition, when the conditional expression (2) is satisfied, it is possible to keep the axial chromatic aberration and spherical aberration stable. Furthermore, when the conditional expression (3) is satisfied, it is possible to keep the axial chromatic aberration and off-axis chromatic aberration stable while properly correcting those chromatic aberrations.

In such configuration, according to this embodiment, the third lens L3 is shaped to form a meniscus lens that directs a concave surface on the object side and the fourth lens L4 is shaped to form a biconvex lens.

The fifth lens L5 is shaped to form a biconcave lens. In this fifth lens L5, a surface thereof on the image side is shaped to form an aspheric shape, which is concaved on the image side near the optical axis and is convex on the image side at the periphery, i.e. aspheric shape having an inflection point. Because of this, an incident angle of a light beam emitted from the fifth lens L5 to an image plane is restrained.

In the embodiment, the lens surfaces of all lenses are formed to be an aspheric surface as necessary.

When the aspheric surface applied to the lens surfaces have an axis Z in the optical axis direction, a height H in a direction perpendicular to the optical axis, a conical coefficient k, and the aspheric coefficients $A_4$, $A_6$, $A_8$, and $A_{10}$, the aspheric surfaces of the lens surfaces may be expressed as follows. Here, even in case of an imaging lens according to a second embodiment, which will be described later, the lens surfaces of all lenses are formed to be an aspheric surface as necessary, and aspheric surface shapes applied in theses lens surfaces are expressed by the following formula similarly to this embodiment:

[Formula 1]

$$Z = \frac{\frac{H^2}{R}}{1+\sqrt{1-(k+1)\frac{H^2}{R^2}}} + A_4H^4 + A_6H^6 + A_8H^8 + A_{10}H^{10}$$

The imaging lens according to this embodiment satisfies the following conditional expressions (4) to (6) in addition to the aforementioned conditional expressions (1) to (3):

$$0.4<f4/f<1.0 \quad (4)$$

$$\Sigma d/f<1.2 \quad (5)$$

$$|f5/f|<1.0 \quad (6)$$

In the above conditional expressions, f: Focal length of the whole lens system f4: Focal length of the fourth lens L4 f5: Focal length of the fifth lens L5

Σd: Distance on the optical axis from a surface of the first lens L1 on the object side to a surface of the fifth lens L5 on the image side.

When the conditional expressions (4) to (6) are satisfied, it is possible to obtain the following effects respectively. When the conditional expression (4) is satisfied, it is possible to keep the maximum angle of emergence of the off-axis principal light beam small, while keeping each aberration stable. In addition, when the conditional expression (5) is satisfied, it is possible to attain miniaturization of the imaging lens. Furthermore, when the conditional expression (6) is satisfied, it is possible to attain miniaturization of the imaging lens while keeping the focal length long.

Here, it is not necessary to satisfy all of the above conditional expressions (1) to (6). When any single one of the conditional expressions (1) to (6) is individually satisfied, it is possible to obtain an effect corresponding to the respective conditional expression.

Next, Numerical Data Examples of the embodiment will be described. In each of Numerical Data Examples, f represents a focal length of a whole lens system, Fno represents an F number, and ω represents a half angle of view, respectively. In addition, i represents a surface number counted from the object side, R represents a curvature radius, d represents a distance between lens surfaces (an on-axis surface spacing) along the optical axis, Nd represents a refractive index for a d line, and νd represents Abbe's number at the d line. Here, the aspheric surfaces are indicated with surface numbers affixed with * (asterisk).

Numerical Data Example 1

Basic lens data are shown below.
f = 3.903 mm, Fno = 2.805, ω = 31.59°
Unit: mm
Surface Data

| Surface Number i | R | d | Nd | νd |
|---|---|---|---|---|
| (Object) | ∞ | ∞ | | |
| 1 (Stop) | ∞ | 0 | | |
| 2* | 1.571 | 0.5500 | 1.52470 | 56.2 (=νd1) |
| 3* | −7.132 | 0.1500 | | |
| 4 | −3.521 | 0.3000 | 1.61420 | 26.0 (=νd2) |
| 5* | −19.595 | 0.2800 | | |
| 6* | −1.823 | 0.2800 | 1.58500 | 29.0 |
| 7* | −5.912 | 0.3600 | | |
| 8* | 3.357 | 0.8500 | 1.52470 | 56.2 |
| 9* | −1.613 | 0.3000 | | |
| 10* | −2.617 | 0.3300 | 1.52470 | 56.2 |
| 11* | 3.067 | 0.3000 | | |
| 12 | ∞ | 0.1500 | 1.51633 | 64.12 |
| 13 | ∞ | 0.8823 | | |
| (Image plane) | ∞ | | | |

f1 = 2.508
f2 = −7.038
f12 = 3.573
f4 = 2.206
f5 = −2.639
Σd = 3.400

Aspheric Surface Data

Second Surface
k = −1.544427E−01, $A_4$ = 1.976046E−02, $A_6$ = −1.793809E−02

Third Surface
k = 1.063940, $A_4$ = 4.713006E−03, $A_6$ = −2.945120E−02

Fifth Surface
k = 1.415349E+02, $A_4$ = −2.371673E−02, $A_6$ = 1.311554E−02

Sixth Surface
k = −2.723790, $A_4$ = −1.147380E−02, $A_6$ = −4.130846E−02, $A_8$ = −3.948624E−03, $A_{10}$ = 5.021037E−02

Seventh Surface
k = −9.933691, $A_4$ = 3.758781E−03, $A_6$ = 1.719515E−02, $A_8$ = 1.736953E−02, $A_{10}$ = 1.092378E−02

Eighth Surface
k = −2.241293E+01, $A_4$ = −2.578027E−02, $A_6$ = −7.694008E−03, $A_8$ = −1.375408E−03, $A_{10}$ = 6.496087E−04

-continued

Basic lens data are shown below.
f = 3.903 mm, Fno = 2.805, ω = 31.59°
Unit: mm
Surface Data Ninth Surface
k = 6.248352E−02, $A_4$ = 1.165596E−01, $A_6$ = −3.911326E−02, $A_8$ = 1.261679E−02, $A_{10}$ = 1.134638E−04

Tenth Surface
k = 1.999301, $A_4$ = 3.503592E−02, $A_6$ = −3.907364E−02, $A_8$ = 1.551177E−02, $A_{10}$ = −3.231912E−03

Eleventh Surface
k = 2.223974E−01, $A_4$ = −9.602329E−02, $A_6$ = 7.338596E−03, $A_8$ = −1.181135E−03, $A_{10}$ = −3.315528E−04

Values of the conditional expressions (1) to (6) are as follows:

f12/f = 0.915
|f1/f2| = 0.356
νd1 − νd2 = 30.2
f4/f = 0.565
Σd/f = 0.871
|f5/f| = 0.676

Figure 2:
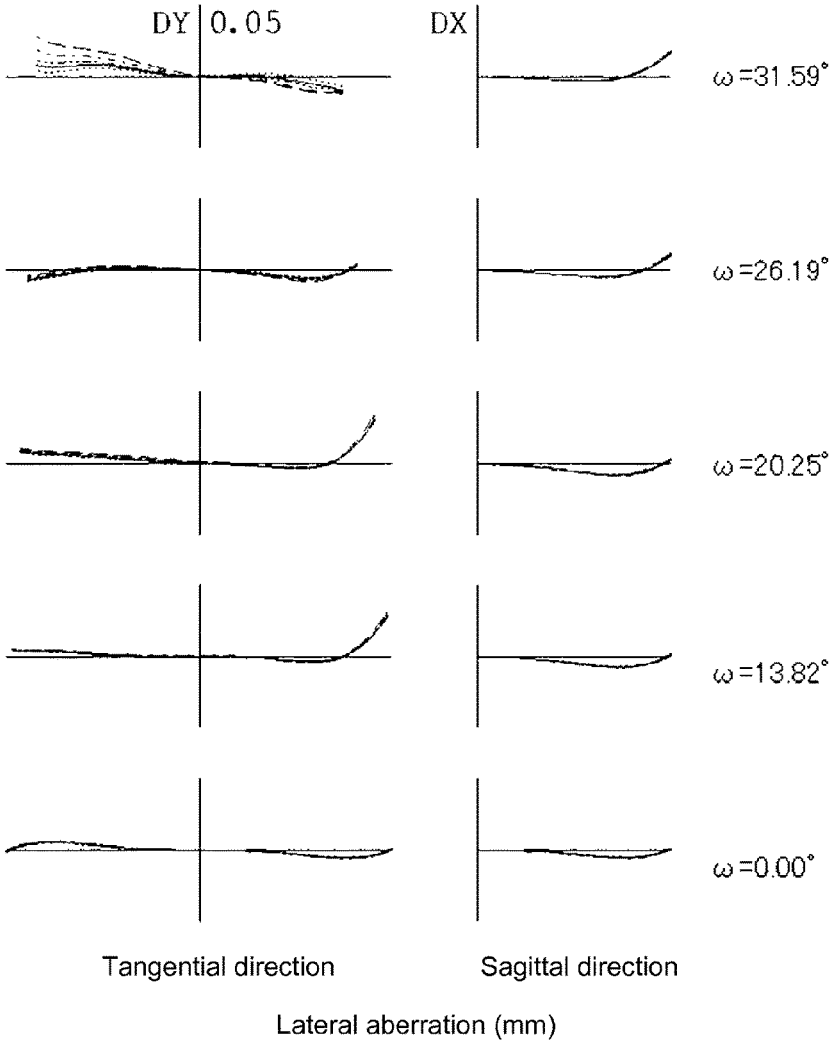
FIG. 2 is an aberration diagram showing a lateral aberration of the imaging lens in Numerical Data Example 1.
Figure 3:
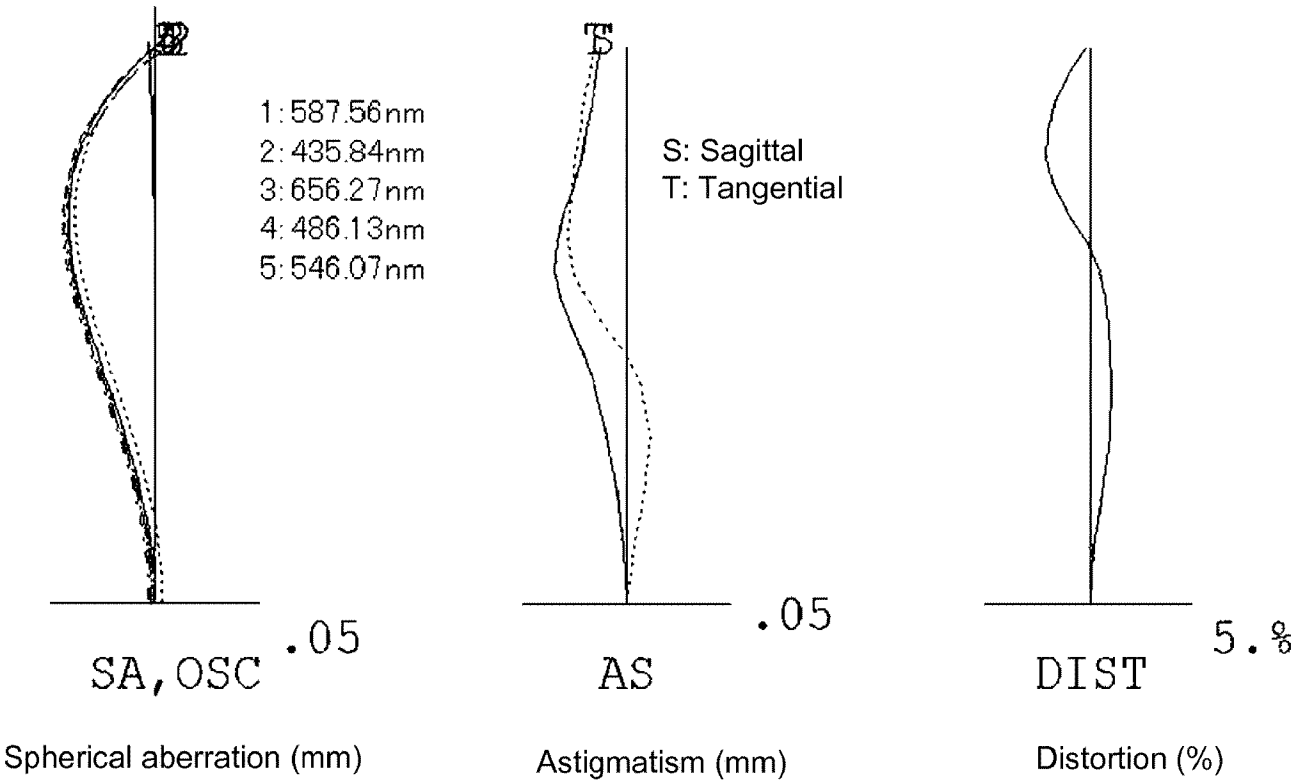
FIG. 3 is an aberration diagram showing a spherical aberration, an astigmatism, and a distortion of the imaging lens in Numerical Data Example 1.
Figure 4:
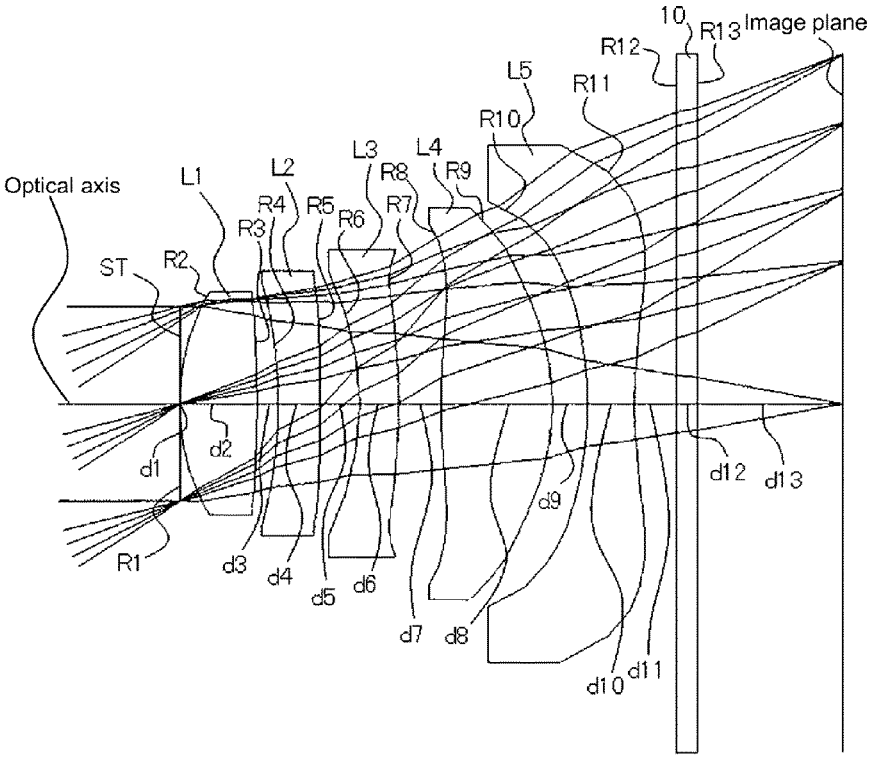
FIG. 4 is a schematic sectional view showing a configuration of an imaging lens in Numerical Data Example 2.

Accordingly, the imaging lens of Numerical Data Example 1 satisfies the conditional expressions (1) to (6). FIG. 2 shows the lateral aberration that corresponds to the half angle of view ω in the imaging lens of Numerical Data Example 1 by dividing into a tangential direction and sagittal direction (which is also the same in FIGS. 5, 8, and 11). Furthermore, FIG. 3 shows a spherical aberration SA (mm), an astigmatism AS (mm), and a distortion DIST (%), respectively. In the aberration diagrams, the Offence against the Sine Condition (OSC) is also indicated for the spherical aberration diagram in addition to the aberrations at the respective wavelengths of 587.56 nm, 435.84 nm, 656.27 nm, 486.13 nm, and 546.07 nm. Further, in the astigmatism diagram, the aberration on the sagittal image surface S and the aberration on the tangential image surface T are respectively indicated (which are the same in FIGS. 6, 9, and 12).

As shown in FIGS. 2 and 3, in the imaging lens of Numerical Data Example 1, the respective aberrations are satisfactorily corrected. Especially, as shown in the astigmatism diagram, the astigmatic difference is very small, the image surface is satisfactorily corrected, and the distortion is also small.

Numerical Data Example 2

Basic lens data are shown below.
f = 3.899 mm, Fno = 2.800, ω = 32.67°
Unit: mm
Surface data

| Surface Number i | R | d | Nd | νd |
|---|---|---|---|---|
| (Object) | ∞ | ∞ | | |
| 1 (Stop) | ∞ | 0 | | |
| 2* | 1.604 | 0.5500 | 1.52470 | 56.2 (=νd1) |
| 3* | −8.437 | 0.1500 | | |
| 4 | −3.456 | 0.3000 | 1.61420 | 26.0 ( =νd2) |
| 5* | −18.051 | 0.2800 | | |
| 6* | −1.948 | 0.2800 | 1.58500 | 29.0 |
| 7* | −4.589 | 0.3000 | | |
| 8* | 3.916 | 0.8000 | 1.52470 | 56.2 |
| 9* | −1.597 | 0.2500 | | |
| 10* | −2.618 | 0.3300 | 1.52470 | 56.2 |
| 11* | 3.256 | 0.3000 | | |

-continued

| Basic lens data are shown below. f = 3.899 mm, Fno = 2.800, ω = 32.67° Unit: mm Surface data | | | | |
|---|---|---|---|---|
| 12 | ∞ | 0.1500 | 1.51633 | 64.12 |
| 13 | ∞ | 1.0397 | | |
| (Image plane) | ∞ | | | |

f1 = 2.618
f2 = −7.014
f12 = 3.817
f4 = 2.276
f5 = −2.713
Σd = 3.240

Aspheric Surface Data

Second Surface k = −1.439472E−01, $A_4$ = 2.032875E−02, $A_6$ = −1.399217E−02

Third Surface k = 1.913498, $A_4$ = 4.854973E−03, $A_6$ = −1.585207E−02

Fifth Surface k = 2.521344E+02, $A_4$ = −2.591410E−02, $A_6$ = 3.798179E−03

Sixth Surface k = −3.165513, $A_4$ = −7.669636E−03, $A_6$ = −4.014852E−02, $A_8$ = 5.980691E−03, $A_{10}$ = 3.235352E−02

Seventh Surface k = −3.803800, $A_4$ = 1.097028E−03, $A_6$ = 1.770991E−02, $A_8$ = 1.736123E−02, $A_{10}$ = 1.453023E−02

Eighth Surface k = −5.618736E+01, $A_4$ = −3.829839E−02, $A_6$ = −1.530875E−02, $A_8$ = −3.059261E−03, $A_{10}$ = 4.242948E−04

Ninth Surface k = 8.069668E−02, $A_4$ = 1.050962E−01, $A_6$ = −4.000834E−02, $A_8$ = 1.262215E−02, $A_{10}$ = −9.911318E−05

Tenth Surface k = 2.019736, $A_4$ = 4.417573E−02, $A_6$ = −3.888932E−02, $A_8$ = 1.333875E−02, $A_{10}$ = −4.117009E−03

Eleventh Surface k = 8.429077E−01, $A_4$ = −9.283294E−02, $A_6$ = 9.981823E−03, $A_8$ = −1.869262E−03, $A_{10}$ = −4.558872E−04

Values of each conditional expression are as follows:

f12/f = 0.979
|f1/f2| = 0.373
νd1 − νd2 = 30.2
f4/f = 0.584
Σd/f = 0.831
|f5/f| = 0.696

Figure 5:
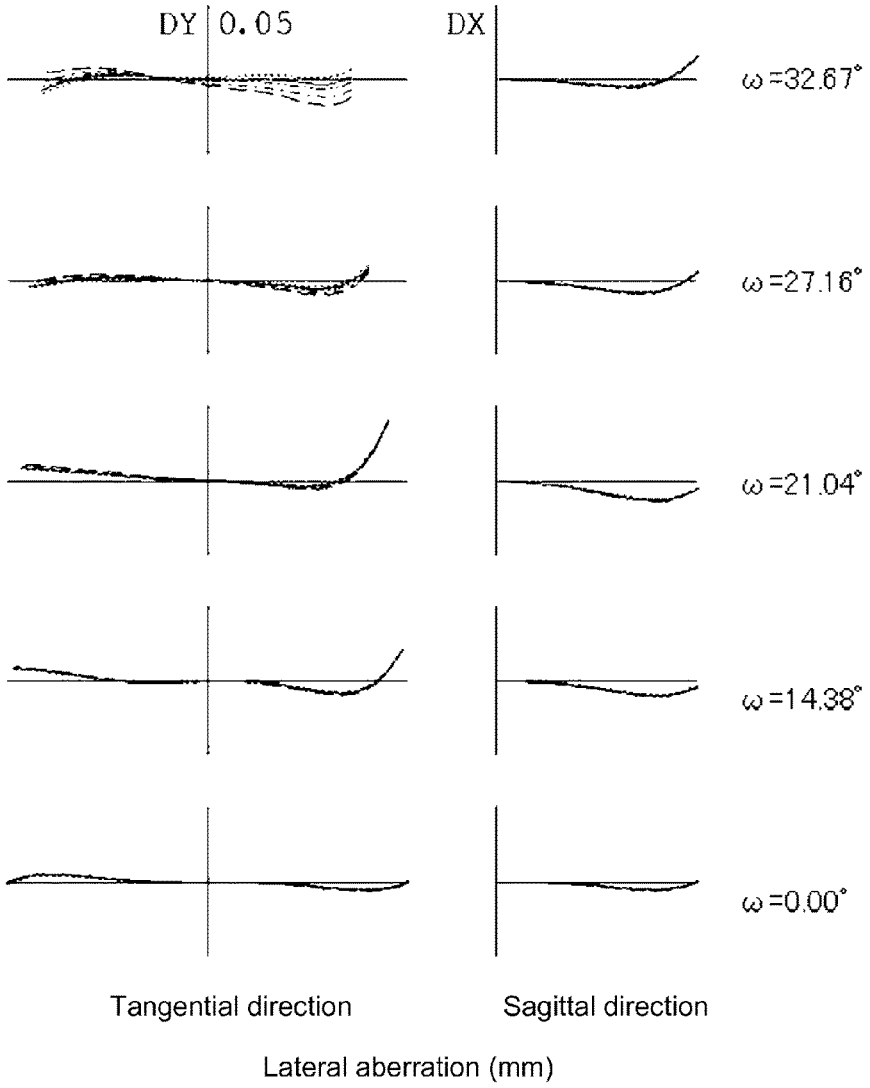
FIG. 5 is an aberration diagram showing a lateral aberration of the imaging lens in Numerical Data Example 2.
Figure 6:
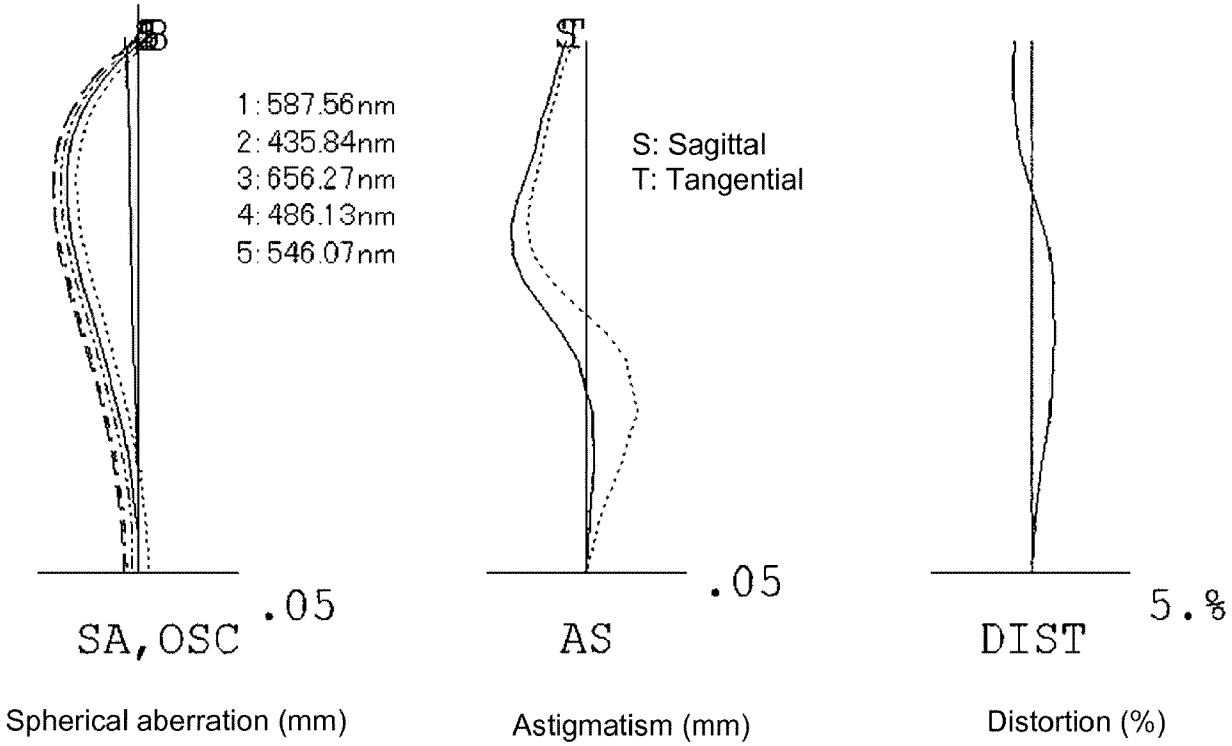
FIG. 6 is an aberration diagram showing a spherical aberration, an astigmatism, and a distortion of the imaging lens in Numerical Data Example 2.
Figure 7:
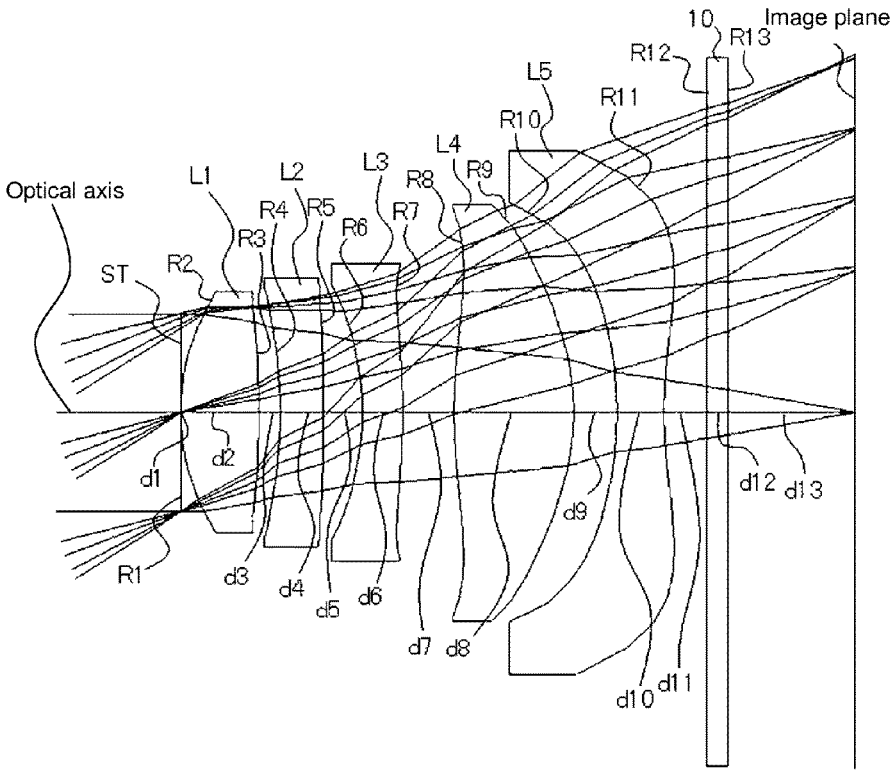
FIG. 7 is a schematic sectional view showing a configuration of an imaging lens in Numerical Data Example 3.

Accordingly, the imaging lens of Numerical Data Example 2 satisfies the conditional expressions (1) to (6). FIG. 5 shows the lateral aberration that corresponds to the half angle of view ω in the imaging lens of Numerical Data Example 2, and FIG. 6 shows the spherical aberration SA (mm), the astigmatism AS (mm), and the distortion DIST (%), respectively. As shown in FIGS. 5 and 6, in the imaging lens of Numerical Data Example 2, the image surface is satisfactorily corrected, and the respective aberrations are satisfactorily corrected similarly to Numerical Data Example 1.

Numerical Data Example 3

| Basic lens data are shown below. f = 3.907 mm, Fno = 2.805, ω = 32.64° Unit: mm Surface Data | | | | |
|---|---|---|---|---|
| Surface Number i | R | d | Nd | νd |
| (Object) | ∞ | ∞ | | |
| 1 (Stop) | ∞ | 0 | | |
| 2* | 1.575 | 0.5500 | 1.52470 | 56.2 (= νd1) |
| 3* | −7.276 | 0.1500 | | |
| 4 | −3.502 | 0.3000 | 1.61420 | 26.0 (= νd2) |
| 5* | −19.883 | 0.2800 | | |
| 6* | −1.831 | 0.2800 | 1.58500 | 29.0 |
| 7* | −5.761 | 0.3600 | | |
| 8* | 3.400 | 0.8500 | 1.52470 | 56.2 |
| 9* | −1.611 | 0.3000 | | |
| 10* | −2.619 | 0.3300 | 1.52470 | 56.2 |
| 11* | 3.153 | 0.3000 | | |
| 12 | ∞ | 0.1500 | 1.51633 | 64.12 |
| 13 | ∞ | 0.9013 | | |
| (Image plane) | ∞ | | | |

f1 = 2.521
f2 = −6.969
f12 = 3.615
f4 = 2.212
f5 = −2.674
Σd = 3.400

Aspheric Surface Data

Second Surface k = −1.709914E−01, $A_4$ = 1.904787E−02, $A_6$ = −1.792465E−02

Third Surface k = 7.046181, $A_4$ = 2.542724E−03, $A_6$ = −2.853682E−02

Fifth Surface k = 1.341757E+02, , $A_4$ = −2.342623E−02 $A_6$ = 1.151604E−02

Sixth Surface k = −2.664785, $A_4$ = −1.221495E−02, $A_6$ = −4.161820E−02, $A_8$ = −3.480280E−03, $A_{10}$ = 4.712500E−02

Seventh Surface k = −1.007092E+01, $A_4$ = 3.857254E−03, $A_6$ = 1.729519E−02, $A_8$ = 1.721151E−02, $A_{10}$ = 1.079714E−02

Eighth Surface k = −2.440426E+01, $A_4$ = −2.565446E−02, $A_6$ = −8.232621E−03, $A_8$ = −1.561612E−03, $A_{10}$ = 6.144595E−03

Ninth Surface k = 6.497601E−02, $A_4$ = 1.149186E−01, $A_6$ = −3.897702E−02, $A_8$ = 1.270717E−02, $A_{10}$ = 1.210040E−04

Tenth Surface k = 1.994817, $A_4$ = 3.657337E−02, $A_6$ = −3.934563E−02, $A_8$ = 1.507533E−02, $A_{10}$ = −3.504426E−03

Eleventh Surface k = 3.526177E−02, $A_4$ = −9.652400E−02, $A_6$ = 7.275239E−03, $A_8$ = −1.425736E−03, $A_{10}$ = −3.842309E−04

Values of the conditional expressions (1) to (6) are as follows:

f12/f = 0.925
|f1/f2| = 0.362
νd1 − νd2 = 30.2
f4/f = 0.566
Σd/f = 0.870
|f5/f| = 0.684

Figure 8:
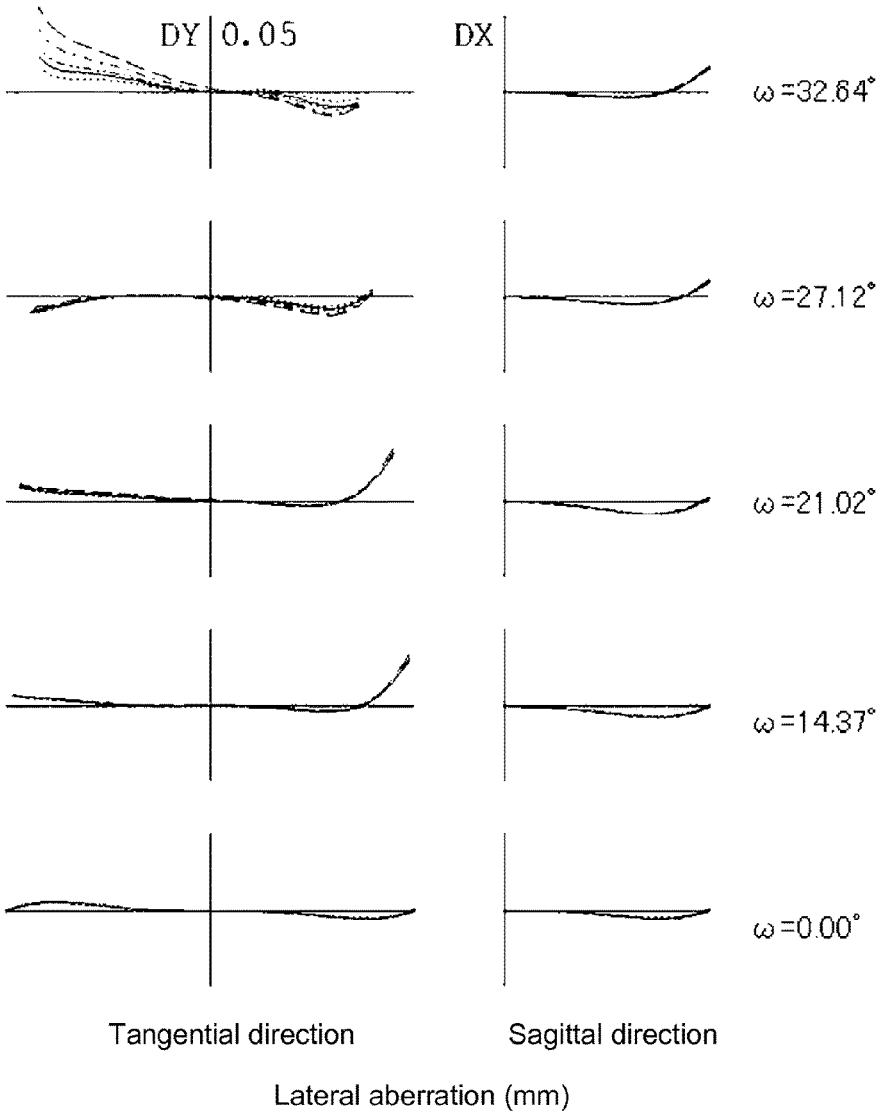
FIG. 8 is an aberration diagram showing a lateral aberration of the imaging lens in Numerical Data Example 3.
Figure 9:
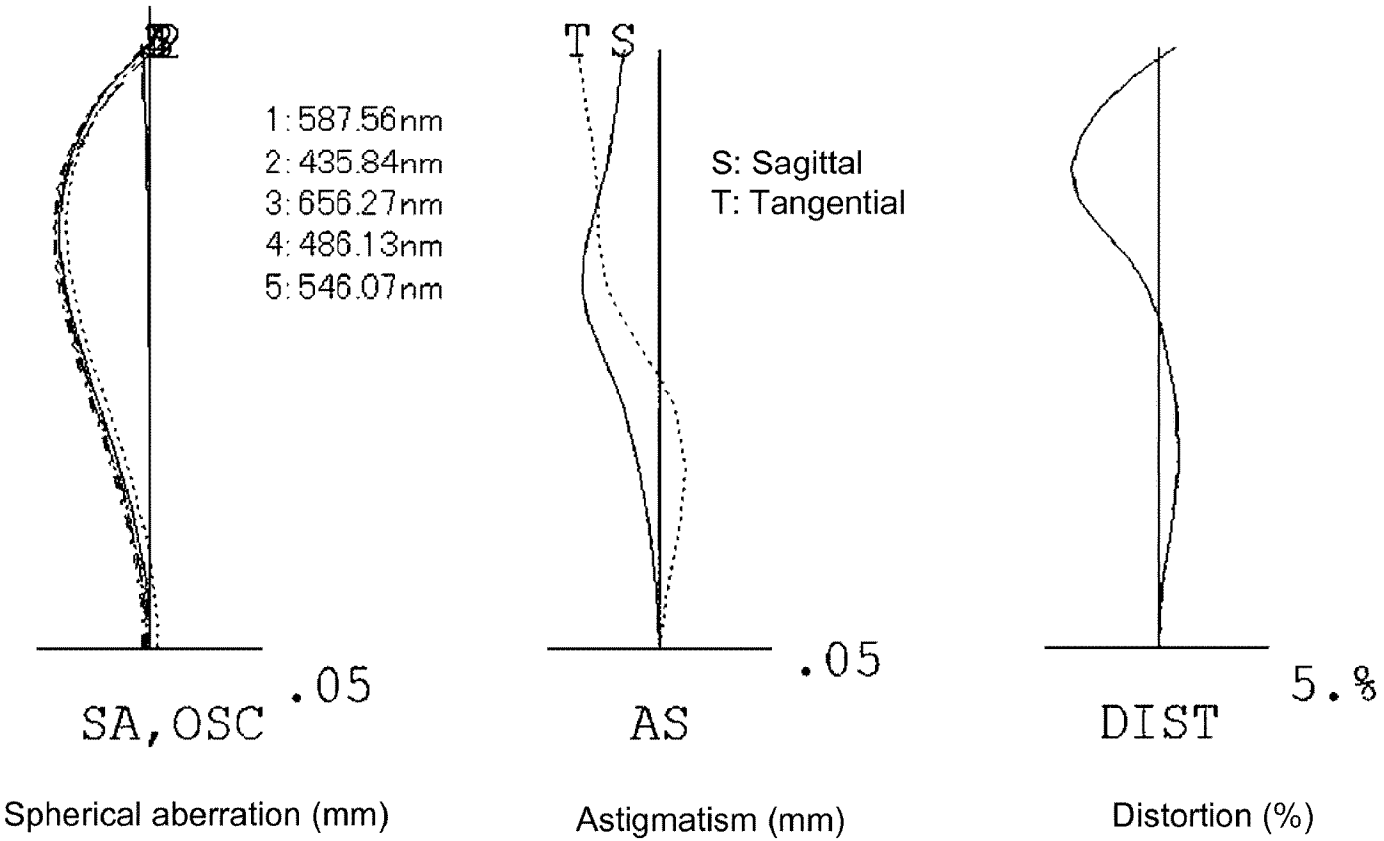
FIG. 9 is an aberration diagram showing a spherical aberration, an astigmatism, and a distortion of the imaging lens in Numerical Data Example 3.
Figure 10:
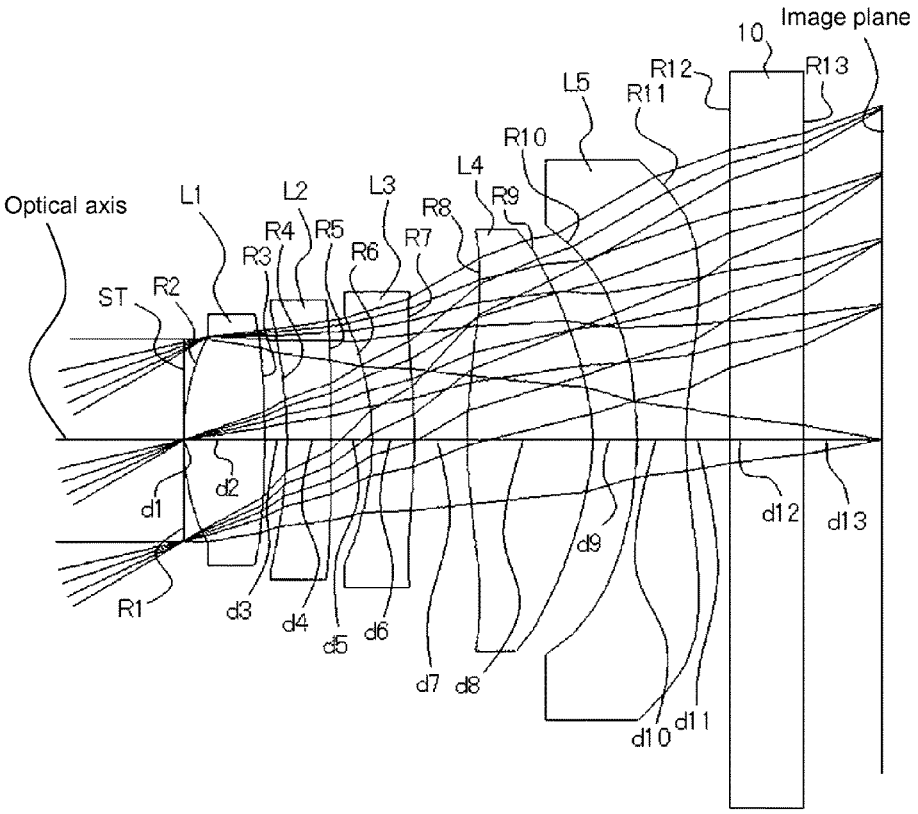
FIG. 10 is a schematic sectional view showing a configuration of an imaging lens in Numerical Data Example 4.

Accordingly, the imaging lens of Numerical Data Example 3 satisfies the conditional expressions (1) to (6). FIG. 8 shows the lateral aberration that corresponds to the half angle of view ω in the imaging lens of Numerical Data Example 3, and FIG. 9 shows the spherical aberration SA (mm), the astigmatism AS (mm), and the distortion DIST (%), respectively. As shown in FIGS. 8 and 9, in the imaging lens of Numerical Data Example 3, the image surface is satisfactorily corrected, and the respective aberrations are satisfactorily corrected similarly to Numerical Data Example 1.

Numerical Data Example 4

Basic lens data are shown below.
f = 3.848 mm, Fno = 2.805, ω = 30.32°
Unit: mm
Surface Data

| Surface Number i | R | d | Nd | νd |
|---|---|---|---|---|
| (Object) | ∞ | ∞ | | |
| 1 (Stop) | ∞ | 0 | | |
| 2* | 1.566 | 0.5500 | 1.52470 | 56.2 (=νd1) |
| 3* | −7.023 | 0.1500 | | |
| 4 | −3.536 | 0.3000 | 1.61420 | 26.0 (=νd2) |
| 5* | −19.676 | 0.2800 | | |
| 6* | −1.837 | 0.2800 | 1.52470 | 56.2 |
| 7* | −6.033 | 0.3600 | | |
| 8* | 3.302 | 0.8500 | 1.52470 | 56.2 |
| 9* | −1.614 | 0.3000 | | |
| 10* | −2.639 | 0.3300 | 1.58500 | 29.0 |
| 11* | 2.922 | 0.3000 | | |
| 12 | ∞ | 0.5000 | 1.51633 | 64.12 |
| 13 | ∞ | 0.5310 | | |
| (Image plane) | ∞ | | | |

f1 = 2.495
f2 = −7.068
f12 = 3.539
f4 = 2.197
f5 = −2.320
Σd = 3.400

Aspheric Surface Data

Second Surface k = −1.514551E−01, $A_4$ = 2.041462E−02, $A_6$ = −2.332746E−02

Third Surface k = 4.107515E−02, $A_4$ = 5.196393E−03, $A_6$ = −3.559135E−02

Fifth Surface k = 8.917948E+01, $A_4$ = −2.298304E−02, $A_6$ = 1.782019E−02

Sixth Surface k = −2.682345, $A_4$ = −1.244876E−02, $A_6$ = −4.412886E−02, $A_8$ = −8.375465E−03, $A_{10}$ = 5.365573E−02

Seventh Surface k = −1.211874E+01, $A_4$ = 4.641584E−03, $A_6$ = 1.781682E−02, $A_8$ = 1.808663E−02, $A_{10}$ = 1.095189E−02

Eighth Surface k = −1.915006E+01, $A_4$ = −2.420006E−02, $A_6$ = −6.347979E−03, $A_8$ = −8.744578E−04, $A_{10}$ = 8.120666E−04

Ninth Surface k = 6.472730E−02, $A_4$ = 1.202224E−01, $A_6$ = −3.910233E−02, $A_8$ = 1.241952E−02, $A_{10}$ = 4.587975E−05

Tenth Surface k = 1.948054, $A_4$ = 3.123665E−02, $A_6$ = −3.881734E−02, $A_8$ = 1.645138E−02, $A_{10}$ = −2.866062E−03

-continued

Basic lens data are shown below.
f = 3.848 mm, Fno = 2.805, ω = 30.32°
Unit: mm
Surface Data Eleventh Surface k = 1.218782, $A_4$ = −9.899569E−02, $A_6$ = 7.341671E−03, $A_8$ = −9.793363E−04, $A_{10}$ = −3.286655E−04

Values of the conditional expressions (1) to (6) are as follows:

f12/f = 0.920
|f1/f2| = 0.353
νd1 − νd2 = 30.2
f4/f = 0.571
Σd/f = 0.884
|f5/f| = 0.603

Figure 11:
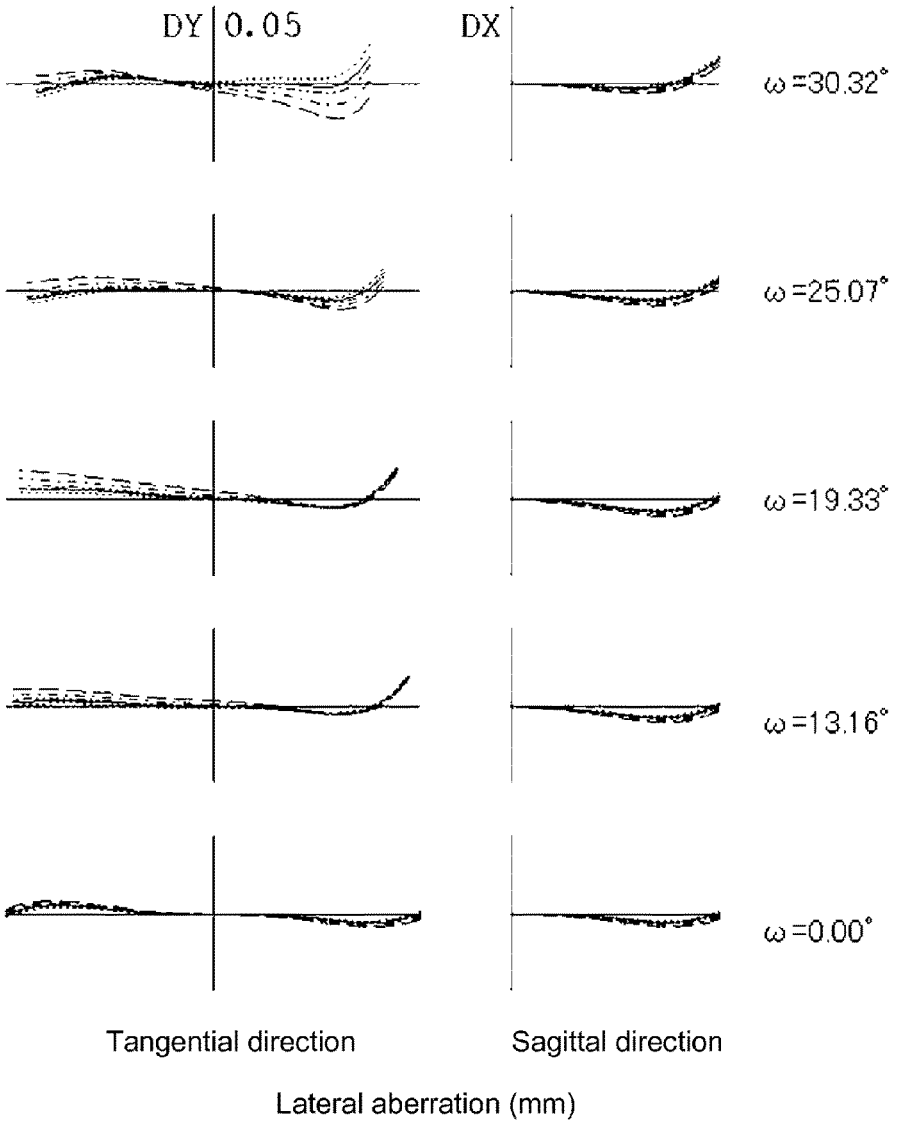
FIG. 11 is an aberration diagram showing a lateral aberration of the imaging lens in Numerical Data Example 4.
Figure 12:
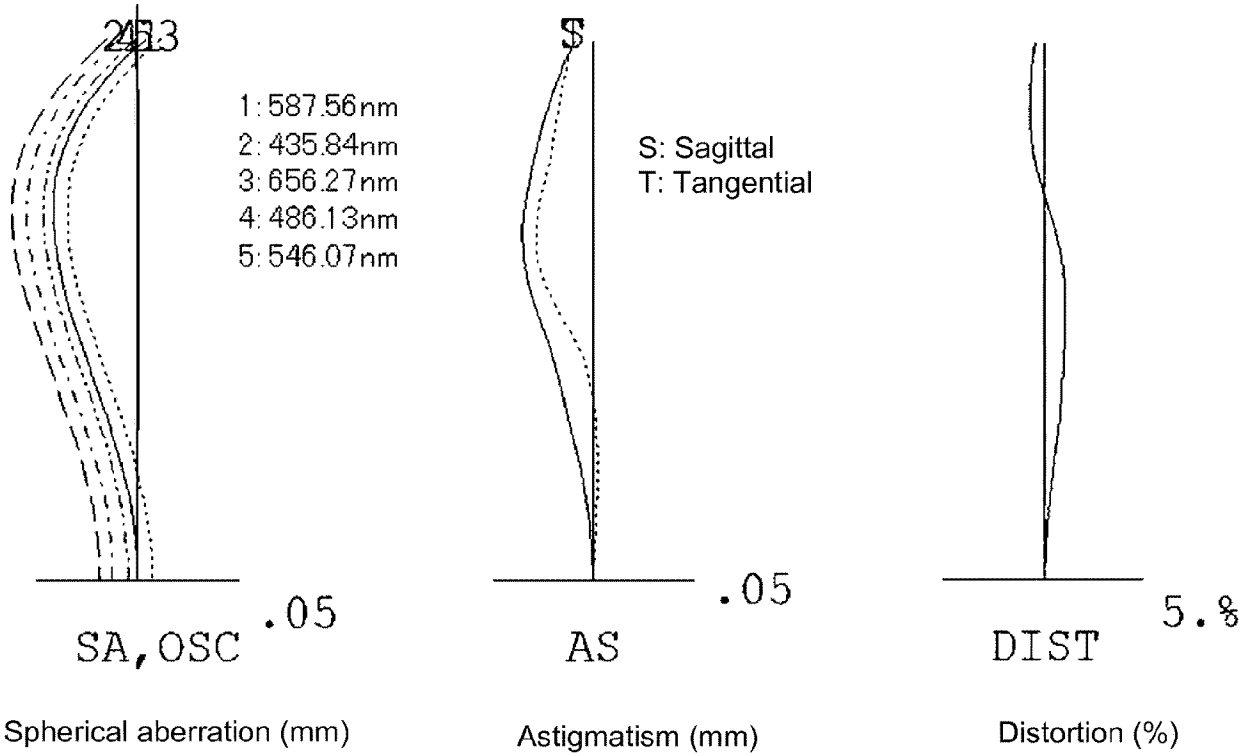
FIG. 12 is an aberration diagram showing a spherical aberration, an astigmatism, and a distortion of the imaging lens in Numerical Data Example 4.

Accordingly, the imaging lens of Numerical Data Example 4 satisfies the conditional expressions (1) to (6). FIG. 11 shows the lateral aberration that corresponds to the half angle of view ω in the imaging lens of Numerical Data Example 4, and FIG. 12 shows the spherical aberration SA (mm), the astigmatism AS (mm), and the distortion DIST (%), respectively. As shown in FIGS. 11 and 12, in the imaging lens of Numerical Data Example 4, the image surface is satisfactorily corrected, and the respective aberrations are satisfactorily corrected similarly to Numerical Data Example 1.

Second Embodiment

Hereunder, referring to the accompanying drawings, a second embodiment of the invention will be described. Similarly to the imaging lens of the first embodiment, the imaging lens of this embodiment includes an aperture stop ST; a first lens L1 having positive refractive power; a second lens L2 having negative refractive power; a third lens L3 having negative refractive power; a fourth lens L4 having positive refractive power; and a fifth lens L5 having negative refractive power, which are arranged in this order from the object side towards the image side of an imaging lens. A cover glass 10 is provided between the fifth lens L5 and the image plane.

Figure 13:
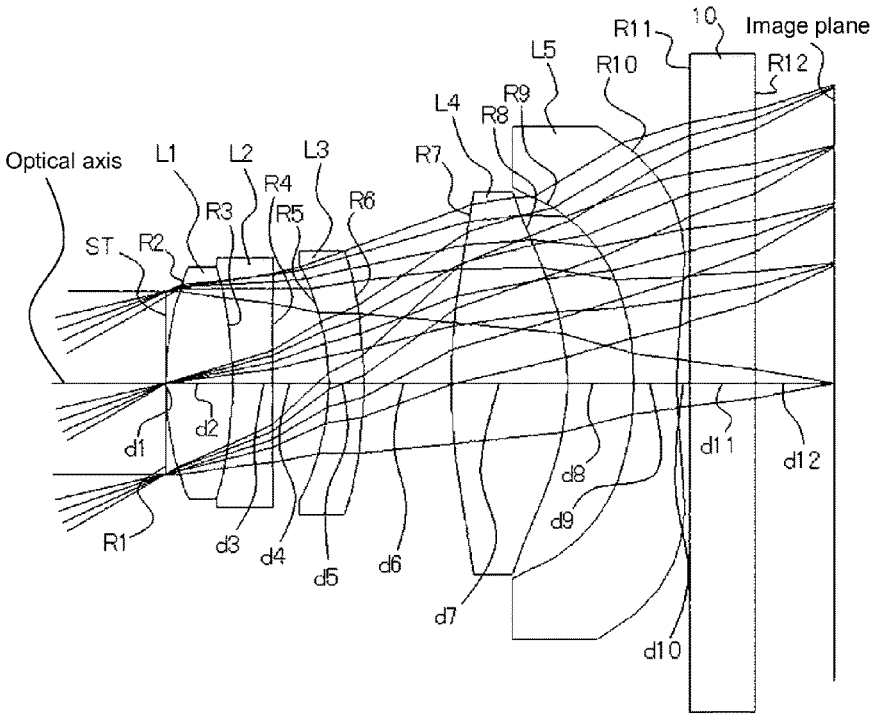
FIG. 13 is a schematic sectional view showing a configuration of an imaging lens in Numerical Data Example 5.

According to the imaging lens of this embodiment, however, the second lens L2 is a biconcave lens, the first lens L1 and the second lens L2 are combined as shown in FIG. 13. With the lens configuration like this, it is possible to more suitably correct chromatic aberration.

More specifically, in the imaging lens of this embodiment, the first lens L1 is biconvex lens, the second lens L2 is a biconcave lens, and those lenses are combined. The third lens L3 is a meniscus lens that directs a concave surface on the object side, and the fourth lens L4 is a biconvex lens. The fifth lens L5 is a biconcave lens, and a surface thereof on the image side is formed to be an aspheric shape having an inflection point.

Even in this embodiment, the imaging lens is configured to satisfy the following conditional expressions (1) to (6) similarly to the first embodiment.

$$0.7<f12/f<1.4 \quad (1)$$

$$0.2<|f1/f2|<0.6 \quad (2)$$

$$15<\nu d1-\nu d2 \quad (3)$$

$$0.4<f4/f<1.0 \quad (4)$$

$$\Sigma d/f<1.2 \quad (5)$$

$$|f5/f|<1.0 \quad (6)$$

In the above conditional expressions, f: Focal length of the whole lens system f1: Focal length of the first lens L1 f2: Focal length of the second lens L2 f12: Composite focal length of the first lens L1 and the second lens L2 vd1: Abbe's number of the first lens L1 vd2: Abbe's number of the second lens L2 f4: Focal length of the fourth lens L4 f5: Focal length of the fifth lens L5

Σd: Distance on the optical axis from a surface of the first lens L1 on the object side to a surface of the fifth lens L5 on the image side.

Next, Numerical Data Examples of the imaging lens according to this embodiment are shown. In this Numerical Data Example, f is a focal length of the whole lens system, Fno represents an F number, and ω represents a half angle of view, respectively. Moreover, i represents a surface number counted from the object side, R represents a curvature radius, d is a distance between lens surfaces, Nd on the optical axis is refractive index for a d line, and νd is Abbe's number at a d line, respectively. Here, the aspheric surfaces are indicated with surface numbers affixed with * (asterisk).

Numerical Data Example 5

Basic lens data are shown below.
f = 3.871 mm, Fno = 2.800, ω = 30.17°
Unit: mm
Surface Data

| Surface Number i | R | d | Nd | νd |
|---|---|---|---|---|
| (Object) | ∞ | ∞ | | |
| 1 (Stop) | ∞ | 0 | | |
| 2* | 2.393 | 0.5000 | 1.67790 | 55.5(=νd1) |
| 3 | −3.334 | 0.3000 | 1.66446 | 36.0 (=νd2) |
| 4 | 41.657 | 0.4272 | | |
| 5* | −1.904 | 0.2640 | 1.58500 | 29.0 |
| 6* | −4.245 | 0.6695 | | |
| 7* | 4.525 | 0.8798 | 1.52470 | 56.2 |
| 8* | −1.707 | 0.4993 | | |
| 9* | −2.515 | 0.3234 | 1.58500 | 29.0 |
| 10* | 3.495 | 0.1000 | | |
| 11 | ∞ | 0.5000 | 1.51633 | 64.12 |
| 12 | ∞ | 0.5945 | | |
| (Image plane) | ∞ | | | |

f1 = 2.130
f2 = −4.633
f12 = 3.660
f4 = 2.483
f5 = −2.451
Σd = 3.863

Aspheric Surface Data

Second Surface k = 2.191111, $A_4$ = −9.435404E−03, $A_6$ = −3.285189E−02,
$A_8$ = 3.672070E−02, $A_{10}$ = −3.270308E−02

Fifth Surface k = −1.984333, $A_4$ = −1.805977E−02, $A_6$ = −2.675334E−02,
$A_8$ = 7.933052E−04, $A_{10}$ = 1.631158E−02

Sixth Surface k = −5.661022E−01, $A_4$ = −1.709355E−02, $A_6$ = −1.717627E−03,
$A_8$ = −5.550278E−03, $A_{10}$ = 4.049249E−03

-continued

Basic lens data are shown below.
f = 3.871 mm, Fno = 2.800, ω = 30.17°
Unit: mm
Surface Data Seventh Surface k = −4.220498, $A_4$ = −8.6408444E−03, $A_6$ = −8.170485E−04,
$A_8$ = −6.511240E−05, $A_{10}$ = 2.033590E−05

Eighth Surface k = 3.300032E−02, $A_4$ = 1.125967E−01, $A_6$ = −3.672376E−02,
$A_8$ = 1.170047E−02, $A_{10}$ = 3.409990E−04

Ninth Surface k = 1.781895, $A_4$ = 6.458725E−03, $A_6$ = −5.275346E−02,
$A_8$ = 1.858108E−02, $A_{10}$ = −1.882214E−03

Tenth Surface k = −5.273886E−01, $A_4$ = −9.506179E−02, $A_6$ = 6.538888E−03,
$A_8$ = −7.519095E−04, $A_{10}$ = 1.760657E−05

Values of each conditional expression are as follows:

f12/f = 0.945
|f1/f2| = 0.460
νd1 − νd2 = 19.5
f4/f = 0.641
Σd/f = 0.998
|f5/f| = 0.633

Accordingly, the imaging lens of Numerical Data Example 5 satisfies the conditional expressions (1) to (6).

Figure 14:
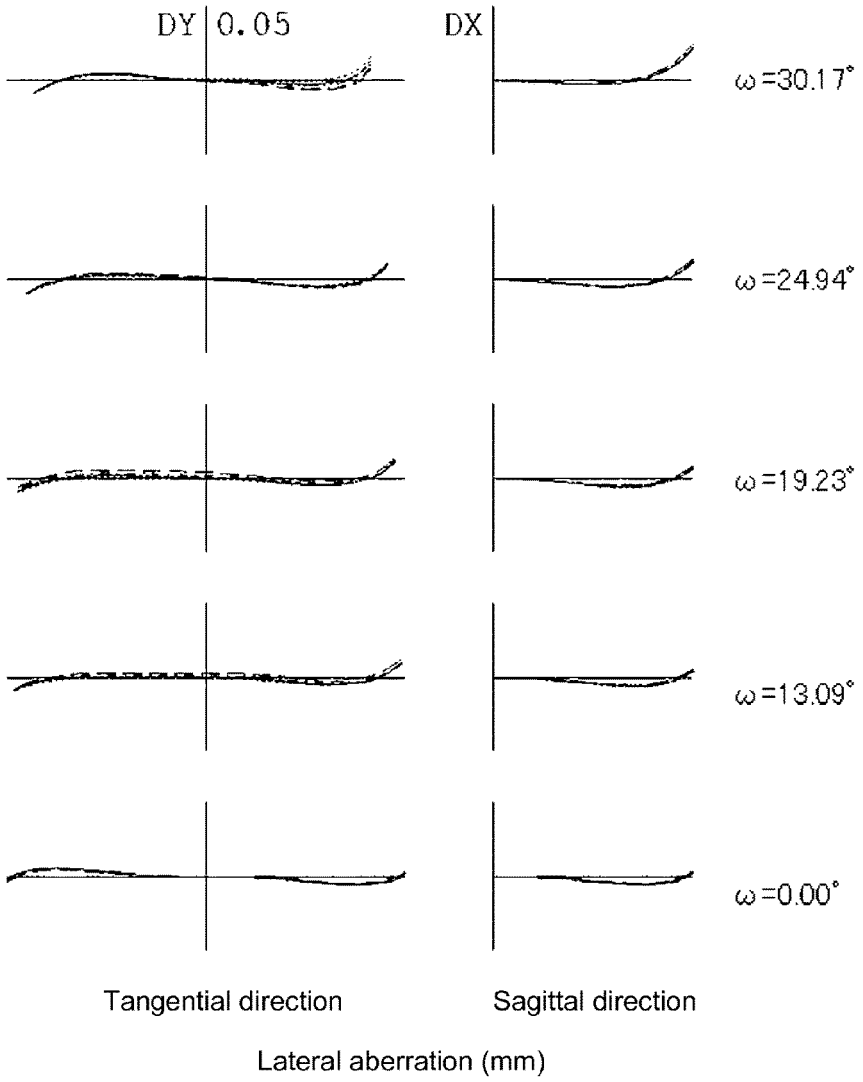
FIG. 14 is an aberration diagram showing a lateral aberration of the imaging lens in Numerical Data Example 5.
Figure 15:
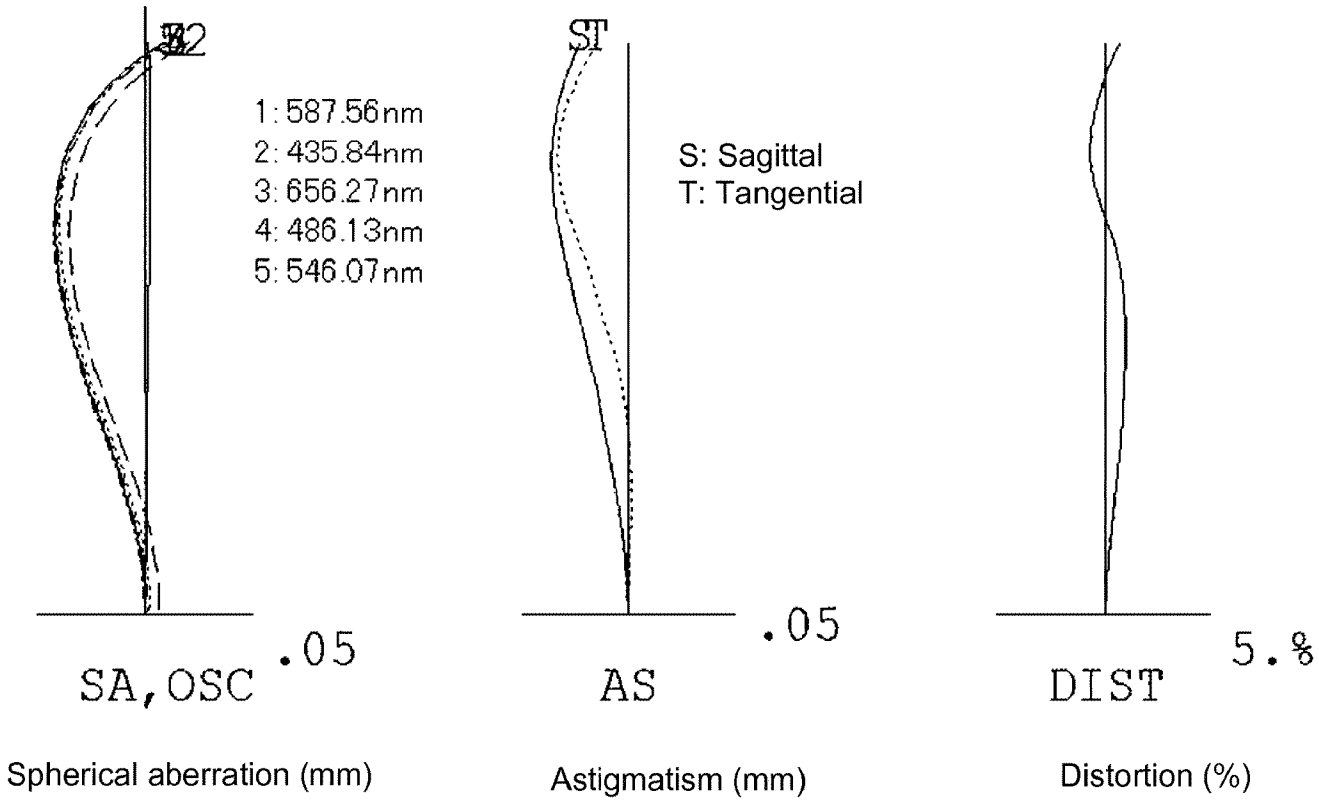
FIG. 15 is an aberration diagram showing a spherical aberration, an astigmatism, and a distortion of the imaging lens in Numerical Data Example 5.

FIG. 14 shows the lateral aberration that corresponds to the half angle of view ω in the imaging lens of Numerical Data Example 5, and FIG. 15 shows the spherical aberration SA (mm), the astigmatism AS (mm), and the distortion DIST (%), respectively. As shown in FIGS. 14 and 15, in the imaging lens of Numerical Data Example 5, the image surface is satisfactorily corrected, and the respective aberrations are satisfactorily corrected similarly to Numerical Data Example 1 to 4.

Accordingly, when the imaging lens of the respective embodiments is applied to an imaging optical system of a cellular phone, a digital still camera, a portable information terminal, a security camera, an onboard camera, a network camera, and the like, it is possible to obtain the high performance and the small size for the camera or the like.

Here, it is noted that the imaging lens of the invention shall not be limited to the above-described embodiments. For example, in the above embodiments, the fifth lens L5 is configured to have an inflection point so as to restrain the incident angle of a light beam into an imaging element. However, if there is some allowance in the incident angle of a light beam into the imaging element and it is not necessary to provide an inflection point to the fifth lens L5, a lens surface of the fifth lens L5 may be formed in a aspheric shape that does not have an inflection point, or one surface or both surfaces of the fifth lens L5 may be formed with a spherical surface(s).

The invention may be applicable to the imaging lens of a device that is required to have a small size and satisfactory aberration correction ability, e.g., the imaging lenses used in the cellular phones, the digital still cameras, and the like.

What is claimed is:

[1. An imaging lens, comprising:

a first lens having positive refractive power;

a second lens having negative refractive power;

a third lens having negative refractive power;

a fourth lens having positive refractive power; and a fifth lens having negative refractive power in this order from an object side to an image side, wherein said first lens is a biconvex lens, said second lens has a concave surface facing the object side, said third lens is a meniscus lens having a concave surface facing the object side, and said fifth lens is a biconcave lens.]

[2. The imaging lens according to claim 1, wherein said first lens and said second lens have a composite focal length f12 and a whole lens system has a focal length f so that the following conditional expression is satisfied:

$0.7<f12/f<1.4$.]

[3. The imaging lens according to claim 1, wherein said first lens has a focal length f1 and said second lens has a focal length f2 so that the following conditional expression is satisfied:

$0.2<f1/f21<0.6$.]

[4. The imaging lens according to claim 1, wherein said first lens has an Abbe's number vd1 and said second lens has an Abbe's number vd2 so that the following conditional expression is satisfied:

$15<vd1-vd2$.]

[5. The imaging lens according to claim 1, wherein said fourth lens has a focal length f4 and a whole lens system has a focal length f so that the following conditional expression is satisfied:

$0.4<f4/f<1.0$.]

[6. The imaging lens according to claim 1, wherein said first lens and said fifth lens are arranged so that a surface of the first lens on the object side is away from a surface of the fifth lens on the image side by a distance Σd on an optical axis and a whole lens system has a focal length f so that the following conditional expression is satisfied:

$\Sigma d/f<1.2$.]

[7. The imaging lens according to claim 1, wherein said fifth lens has a focal length f5 and a whole lens system has a focal length f so that the following conditional expression is satisfied:

$|f5/f|<1.0$.]

[8. An imaging lens, comprising:

a first lens having positive refractive power;

a second lens having negative refractive power;

a third lens having negative refractive power;

a fourth lens having positive refractive power; and a fifth lens having negative refractive power in this order from an object side to an image side, wherein said first lens is a biconvex lens, said second lens has a concave surface facing the object side, said third lens is a meniscus lens having a concave surface facing the object side, and said fourth lens has a focal length f4 and a whole lens system has a focal length f so that the following conditional expression is satisfied:

$0.4<f4/f<1.0$.]

[9. The imaging lens according to claim 8, wherein said first lens and said second lens have a composite focal length f12 and a whole lens system has a focal length f so that the following conditional expression is satisfied:

$0.7<f12/f<1.4$.]

[10. The imaging lens according to claim 8, wherein said first lens has a focal length f1 and said second lens has a focal length f2 so that the following conditional expression is satisfied:

$0.2<|f1/f2|<0.6$.]

[11. The imaging lens according to claim 8, wherein said first lens has an Abbe's number vd1 and said second lens has an Abbe's number vd2 so that the following conditional expression is satisfied:

$15<vd1-vd2$.]

[12. The imaging lens according to claim 8, wherein said first lens and said fifth lens are arranged so that a surface of the first lens on the object side is away from a surface of the fifth lens on the image side by a distance Σd on an optical axis and a whole lens system has a focal length f so that the following conditional expression is satisfied:

$\Sigma d/f<1.2$.]

[13. The imaging lens according to claim 8, wherein said fifth lens has a focal length f5 and a whole lens system has a focal length f so that the following conditional expression is satisfied:

$|f5/f1<1.0$.]

[14. An imaging lens, comprising:

a first lens having positive refractive power;

a second lens having negative refractive power;

a third lens having negative refractive power;

a fourth lens having positive refractive power; and a fifth lens having negative refractive power in this order from an object side to an image side, wherein said first lens is a biconvex lens, said second lens has a concave surface facing the object side, said third lens is a meniscus lens having a concave surface facing the object side, and said fifth lens has a focal length f5 and a whole lens system has a focal length f so that the following conditional expression is satisfied:

$|f5/f1<1.0$.]

[15. The imaging lens according to claim 14, wherein said first lens and said second lens have a composite focal length f12 and a whole lens system has a focal length f so that the following conditional expression is satisfied:

$0.7<f12/f<1.4$.]

[16. The imaging lens according to claim 14, wherein said first lens has a focal length f1 and said second lens has a focal length f2 so that the following conditional expression is satisfied:

$0.2<|f1/f21<0.6$.]

[17. The imaging lens according to claim 14, wherein said first lens has an Abbe's number vd1 and said second lens has an Abbe's number vd2 so that the following conditional expression is satisfied:

$15<vd1-vd2$.]

[18. The imaging lens according to claim 14, wherein said fourth lens has a focal length f4 and a whole lens system has a focal length f so that the following conditional expression is satisfied:

$0.4<f4/f<1.0$.]

[19. The imaging lens according to claim 14, wherein said first lens and said fifth lens are arranged so that a surface of the first lens on the object side is away from a surface of the fifth lens on the image side by a distance Σd on an optical axis and a whole lens system has a focal length f so that the following conditional expression is satisfied:

$$\Sigma d/f<1.2.$$]

*20. An imaging lens, comprising:*

*a first lens;*

*a second lens having negative refractive power;*

*a third lens;*

*a fourth lens; and*

*a fifth lens having negative refractive power, arranged in this order from an object side to an image side,*

*wherein said fourth lens has a convex surface facing the image side,*

*said fifth lens has a concave surface facing the image side, said concave surface being formed in an aspheric shape having an inflection point,*

*said first lens has a focal length f1 and said second lens has a focal length f2 so that the following conditional expression is satisfied:*

$$0.2<|f1/f2|<0.6,$$

*and*

*said first lens and said fifth lens are arranged so that a surface of the first lens on the object side is away from a surface of the fifth lens on the image side by a distance Σd on an optical axis and a whole lens system has a focal length f so that the following conditional expression is satisfied:*

$$\Sigma d/f<1.2.$$

*21. The imaging lens according to claim 20, wherein said fourth lens has positive refractive power.*

*22. The imaging lens according to claim 20, wherein said first lens and said second lens have a composite focal length f12 so that the following conditional expression is satisfied:*

$$0.7<f12/f<1.4.$$

*23. The imaging lens according to claim 20, wherein said first lens has an Abbe's number νd1 and said second lens has an Abbe's number νd2 so that the following conditional expression is satisfied:*

$$15<\nu d1-\nu d2.$$

*24. The imaging lens according to claim 20, wherein said fourth lens has a focal length f4 so that the following conditional expression is satisfied:*

$$0.4<f4/f<1.0.$$

*25. The imaging lens according to claim 20, wherein said fifth lens has a focal length f5 so that the following conditional expression is satisfied:*

$$|f5/f|<1.0.$$

*26. An imaging lens, comprising:*

*a first lens having positive refractive power;*

*a second lens;*

*a third lens;*

*a fourth lens having positive refractive power; and*

*a fifth lens having negative refractive power, arranged in this order from an object side to an image side,*

*said fifth lens has a concave surface facing the image side, said concave surface being formed in an aspheric shape having an inflection point,*

*said first lens and said second lens have a composite focal length f12 and a whole lens system has a focal length f so that the following conditional expression is satisfied:*

$$0.7<f12/f<1.4,$$

*and*

*said first lens and said fifth lens are arranged so that a surface of the first lens on the object side is away from a surface of the fifth lens on the image side by a distance Σd on an optical axis so that the following conditional expression is satisfied:*

$$\Sigma d/f<1.2.$$

*27. The imaging lens according to claim 26, wherein said second lens has a concave surface facing the object side, and*

*said second lens has negative refractive power.*

*28. The imaging lens according to claim 26, wherein said third lens is formed in a meniscus shape and has a concave surface facing the object side, and*

*said third lens has negative refractive power.*

*29. The imaging lens according to claim 26, wherein said first lens has a focal length f1 and said second lens has a focal length f2 so that the following conditional expression is satisfied:*

$$0.2<|f1/f2|<0.6.$$

*30. The imaging lens according to claim 26, wherein said first lens has an Abbe's number νd1 and said second lens has an Abbe's number νd2 so that the following conditional expression is satisfied:*

$$15<\nu d1-\nu d2.$$

*31. The imaging lens according to claim 26, wherein said fourth lens has a focal length f4 so that the following conditional expression is satisfied:*

$$0.4<f4/f<1.0.$$

*32. The imaging lens according to claim 26, wherein said fifth lens has a focal length f5 so that the following conditional expression is satisfied:*

$$|f5/f|<1.0.$$

*33. An imaging lens, comprising:*

*a first lens;*

*a second lens having negative refractive power;*

*a third lens;*

*a fourth lens; and*

*a fifth lens having negative refractive power, arranged in this order from an object side to an image side,*

*wherein said second lens is formed in a meniscus shape,*

*said fourth lens has a convex surface facing the image side,*

*said fifth lens has a concave surface facing the image side, and*

*said concave surface is formed in an aspheric shape having an inflection point.*

*34. The imaging lens according to claim 33, wherein said first lens and said second lens have a composite focal length f12 and a whole lens system has a focal length f so that the following conditional expression is satisfied:*

$$0.7<f12/f<1.4.$$

*35. The imaging lens according to claim 33, wherein said first lens has a focal length f1 and said second lens has a focal length f2 so that the following conditional expression is satisfied:*

$$0.2<|f1/f2|<0.6.$$

*36. The imaging lens according to claim 33, wherein said fourth lens has a focal length f4 and a whole lens system has a focal length f so that the following conditional expression is satisfied:*

$$0.4<f4/f<1.0.$$

*37. The imaging lens according to claim 33, wherein said fifth lens has a focal length f5 and a whole lens system has a focal length f so that the following conditional expression is satisfied:*

$$|f5/f|<1.0.$$

* * * * *